(12) United States Patent
Gooslin (10) Patent No.: US 11,613,204 B1
(45) Date of Patent: Mar. 28, 2023

(54) SEMITRAILER REAR LIGHTING DEVICE

(71) Applicant: Steven Gooslin, Grafton, OH (US)

(72) Inventor: Steven Gooslin, Grafton, OH (US)

(*) Notice: Subject to any disclaimer, the term of this patent is extended or adjusted under 35 U.S.C. 154(b) by 0 days.

(21) Appl. No.: 17/669,058

(22) Filed: Feb. 10, 2022

(51) Int. Cl.
*B60Q 1/42* (2006.01)
*B60Q 1/26* (2006.01)
*B60Q 1/44* (2006.01)

(52) U.S. Cl.
CPC ............ *B60Q 1/42* (2013.01); *B60Q 1/2607* (2013.01); *B60Q 1/44* (2013.01); *B60Y 2200/148* (2013.01)

(58) Field of Classification Search
CPC .. B60Q 1/2657; B60Q 1/2692; B60Q 1/0035; B60Q 1/42; B60Q 1/2607; B60Q 1/44
See application file for complete search history.

(56) References Cited

U.S. PATENT DOCUMENTS

| | | | | |
|---|---|---|---|---|
| 3,691,366 A * | 9/1972 | Spreuer | ................. | B60Q 1/305 362/253 |
| 4,422,664 A * | 12/1983 | Poveromo | ................ | B60P 3/10 280/414.1 |
| 4,565,152 A * | 1/1986 | Bennett | .................... | B60Q 1/50 116/303 |
| 4,801,917 A * | 1/1989 | Winterfeld | ............ | B60Q 1/305 340/475 |
| 5,048,451 A * | 9/1991 | Reimers | ................. | B60Q 1/486 116/35 R |
| 5,924,753 A | 7/1999 | DiBassie | | |
| 6,648,391 B1 | 11/2003 | Whiteford | | |
| 6,863,482 B2 | 3/2005 | Lockhart | | |
| 7,241,019 B1 * | 7/2007 | Tsai | ..................... | B60Q 1/2696 359/520 |
| 7,557,699 B2 * | 7/2009 | Walton | ................... | B60Q 1/305 340/463 |
| 8,552,852 B1 | 10/2013 | Hertz | | |
| 10,703,266 B1 * | 7/2020 | Butler | ..................... | E01F 9/662 |
| 2003/0063475 A1 | 4/2003 | Simmons | | |

\* cited by examiner

*Primary Examiner* — Matthew J. Peerce (57) ABSTRACT

A semitrailer rear lighting device for enhancing safety of a semitrailer hauling an oversized load includes a plurality of brackets, a pair of bars, and an indicator. Each bracket is mountable to a respective opposed side of a semitrailer so that at least two brackets are mounted to each opposed side. Each bar is slidably engaged to the brackets positioned on a respective opposed side of the semitrailer. The bars are selectively extensible from a rear of the semitrailer to position a terminus of the pair of bars past an end of an oversized load that extends past the rear of the semitrailer. The indicator is engaged to the terminus of the pair of bars. The indicator indicates to a trailing motorist one or more of the rear of the semitrailer, the end of the oversized load, a braking action of the semitrailer, or a turning of the semitrailer.

10 Claims, 6 Drawing Sheets

SEMITRAILER REAR LIGHTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lighting devices and more particularly pertains to a new lighting device for enhancing safety of a semitrailer hauling an oversized load. The present invention discloses a light device comprising a pair of bars slidably engageable to opposed sides of a semitrailer by a plurality of brackets so that the pairs of bars is extendable from a rear of the semitrailer. An indicator is engaged to a terminus of the pair of bars is positionable past an end of an oversized load positioned on the semitrailer. The indicator can indicate a width of the semitrailer, braking, turning, and the like.

(2) Description of Related Art Including Information Disclosed Under 37 CFR 1.97 and 1.98

The prior art relates to lighting devices. Related prior art comprises pickup trucks having extending cargo beds and restraints for extended loads comprising warning flags. What is lacking in the prior art is a lighting device which is selectively extendable from a rear of a semitrailer past an end of an oversized load positioned on the semitrailer.

BRIEF SUMMARY OF THE INVENTION

An embodiment of the disclosure meets the needs presented above by generally comprising a plurality of brackets, a pair of bars, and an indicator. Each bracket is configured to be mountable to a respective opposed side of a semitrailer so that at least two brackets are mounted to each opposed side. Each bar is slidably engaged to the brackets positioned on a respective opposed side of the semitrailer. The pair of bars is selectively extensible from a rear of the semitrailer to position a terminus of the pair of bars past an end of an oversized load that extends past the rear of the semitrailer. The indicator is engaged to the terminus of the pair of bars. The indicator is configured to indicate to a trailing motorist one or more of the rear of the semitrailer, the end of the oversized load, a braking action of the semitrailer, or a turning of the semitrailer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new lighting device embodying the principles and concepts of an embodiment of the disclosure and generally designated by the reference numeral 10 will be described.

Figure 4:
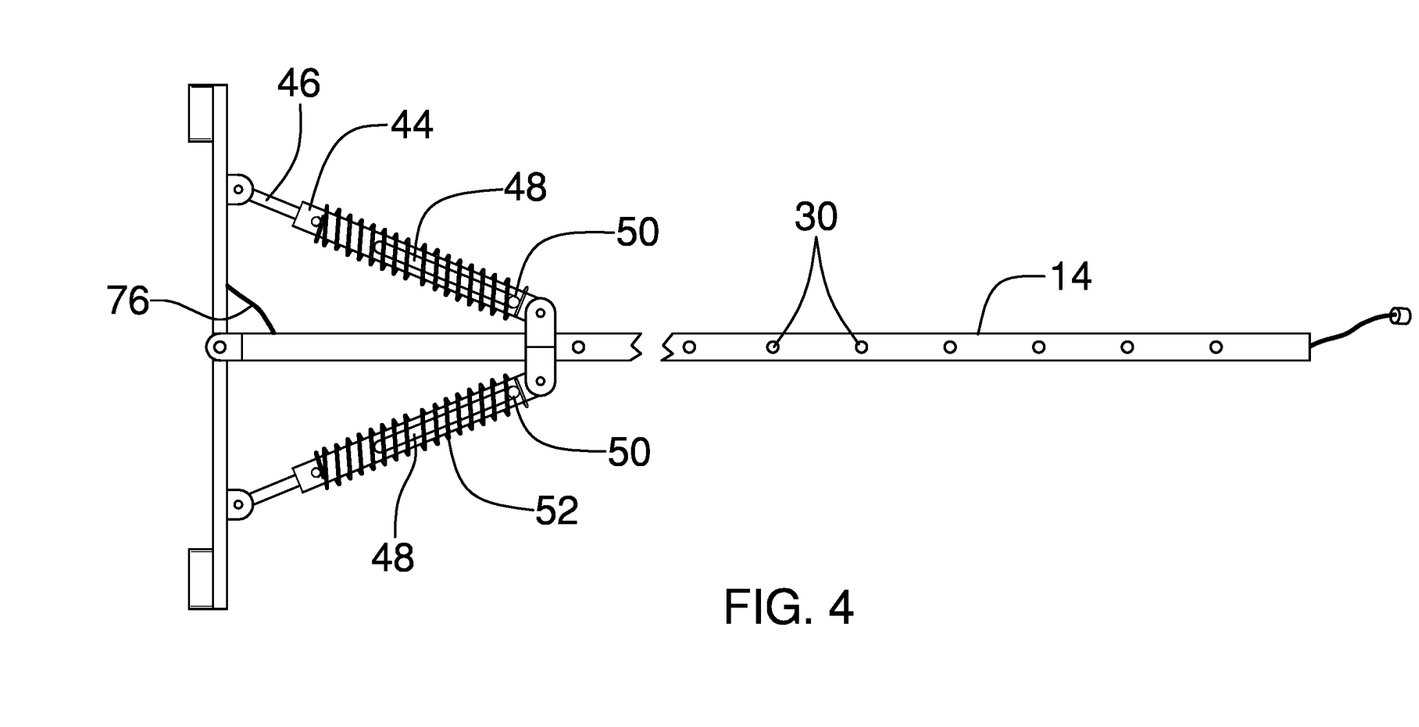
FIG. 4 is a side view of an embodiment of the disclosure.
Figure 5:
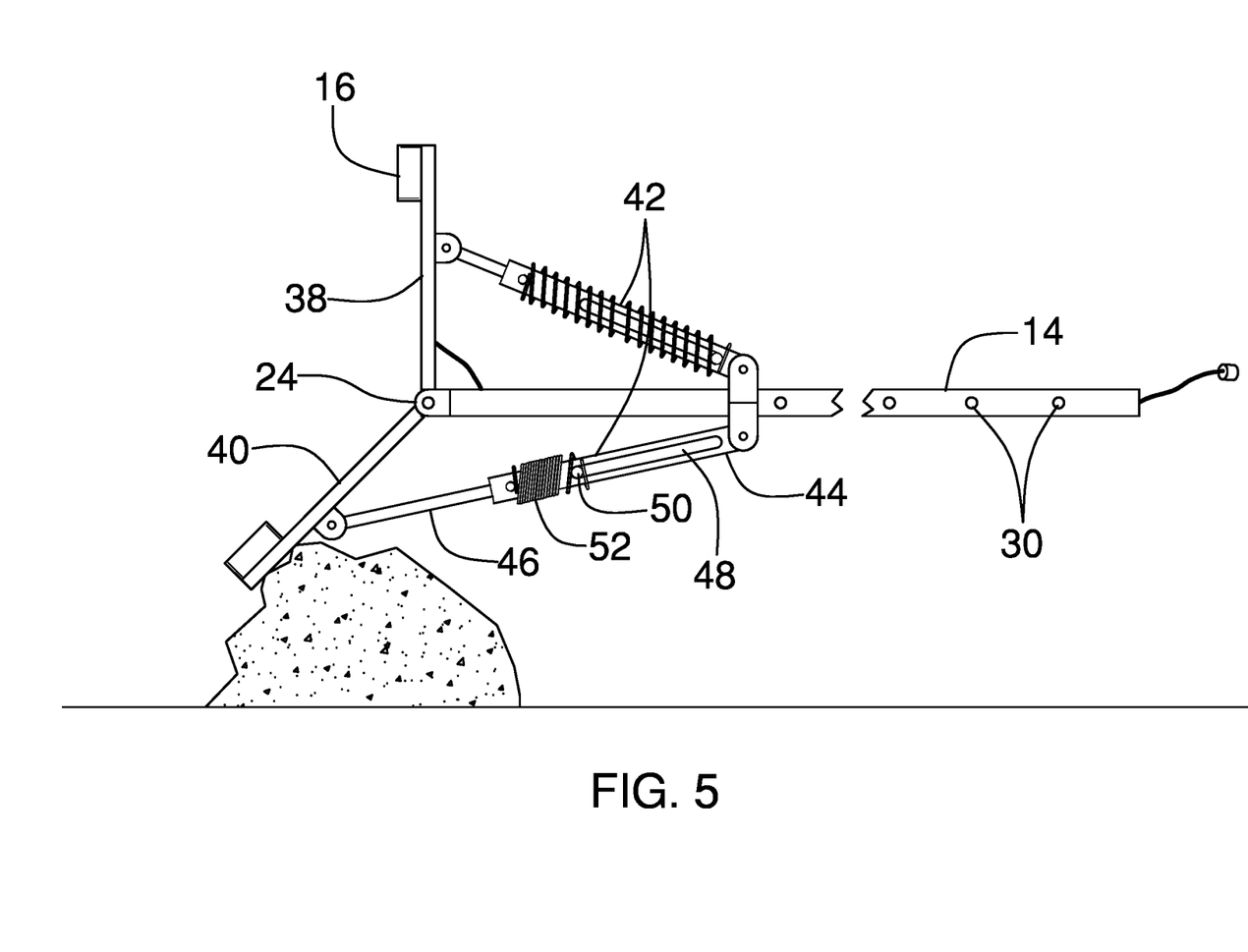
FIG. 5 is an in-use view of an embodiment of the disclosure.
Figure 6:
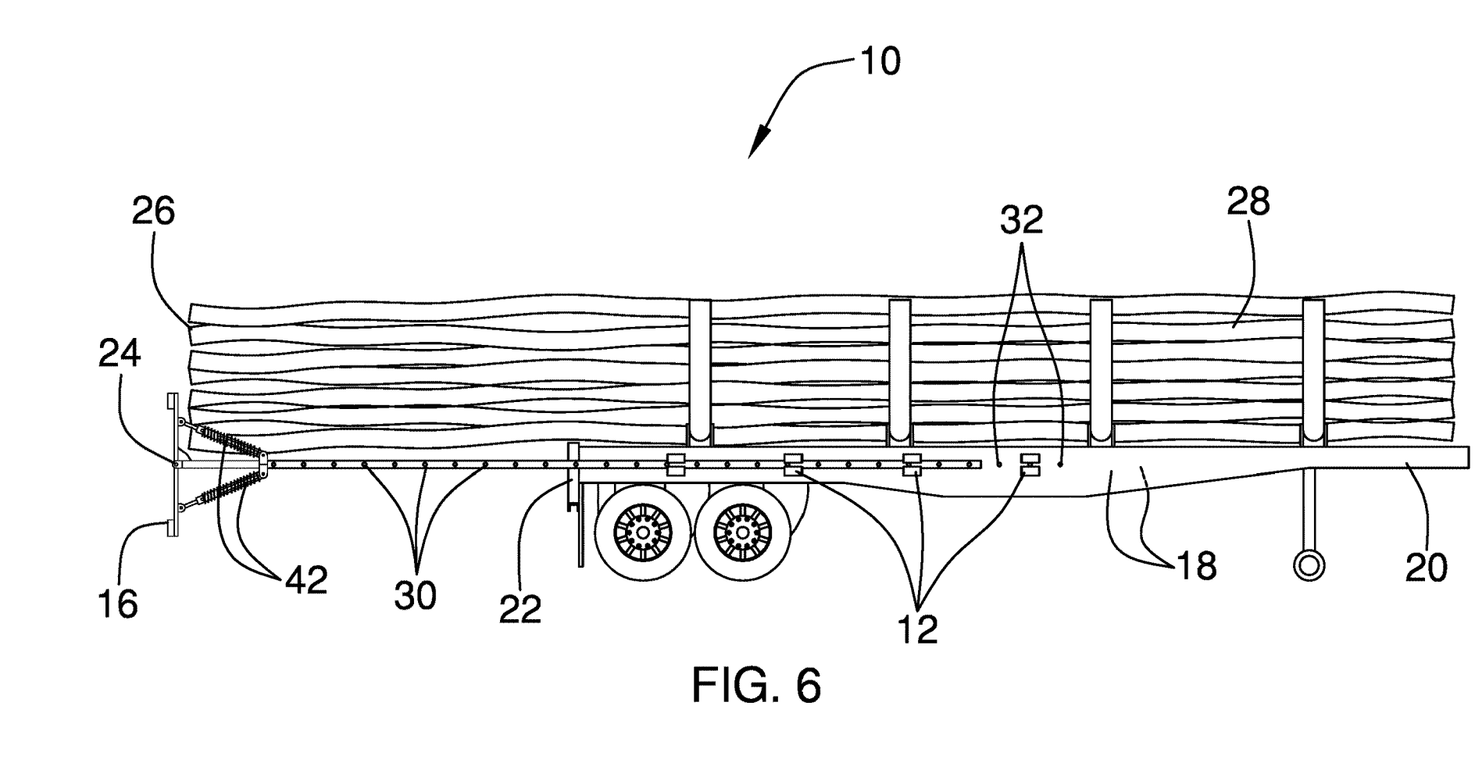
FIG. 6 is an in-use view of an embodiment of the disclosure.

As best illustrated in FIGS. 1 through 6, the semitrailer rear lighting device 10 generally comprises a plurality of brackets 12, a pair of bars 14, and an indicator 16. Each bracket 12 is configured to be mountable to a respective opposed side 18 of a semitrailer 20 so that at least two brackets 12 are mounted to each opposed side 18. The plurality of brackets 12 comprises from four to ten brackets 12. The plurality of brackets 12 may comprise eight brackets 12 evenly distributed between the opposed sides 18 of the semitrailer 20, as shown in FIG. 6.

Each bar 14 is slidably engaged to the brackets 12 positioned on a respective opposed side 18 of the semitrailer 20. The pair of bars 14 is selectively extensible from a rear 22 of the semitrailer 20 to position a terminus 24 of the pair of bars 14 past an end 26 of an oversized load 28 that extends past the rear 22 of the semitrailer 20. A plurality of first holes 30 is positioned in the pair of bars 14. A first hole 30 positioned in a respective bar 14 is configured to be selectively aligned with a respective second hole 32 of a plurality of second holes 32 that is positioned in an associated opposed side 18 of the semitrailer 20. A locking pin (not shown) is insertable through the first hole 30 and the respective second hole 32 to fixedly position the respective bar 14 relative to the semitrailer 20.

The indicator 16 is engaged to the terminus 24 of the pair of bars 14. The indicator 16 is configured to indicate to a trailing motorist one or more of the rear 22 of the semitrailer 20, the end 26 of the oversized load 28, a braking action of the semitrailer 20, or a turning of the semitrailer 20. The indicator 16 comprises a panel 34, which is engaged to the terminus 24 of the pair of bars 14. A plurality of apertures 36 is positioned in the panel 34 and is configured to allow passage of air through the panel 34.

The panel 34 comprises a first piece 38 and a second piece 40. The first piece 38 extends upwardly from the pair of bars 14 and the second piece 40 extends downwardly from the pair of bars 14. The first piece 38 and the second piece 40 are hingedly engaged to the pair of bars 14. Each of a set of biasers 42 is engaged to a respective one of the first piece 38 and the second piece 40, proximate to a respective opposed edge 58 of the panel 34. The biaser 42 extends transversely to an associated bar 14. The panel 34 is biased to a planar configuration perpendicular to the pair of bars 14, as shown in FIG. 4.

The biaser 42 comprises a pipe 44 and a rod 46. The pipe 44 is hingedly engaged to the associated bar 14, while the rod 46 is hingedly engaged to the respective one of the first piece 38 and the second piece 40. The rod 46 is slidably positioned within the pipe 44. A pair of slots 48 is opposingly positioned in the pipe 44. A pair of pins 50 is engaged to the rod 46 distal from the panel 34, with each pin 50 being positioned in a respective slot 48. A spring 52 is positioned around the pipe 44 and is engaged to the pipe 44 distal from the bar 14. The spring 52 also is engaged to the pair of pins 50 so that the spring 52 is compressed when the respective one of the first piece 38 and the second piece 40 is tilted obtusely to the pair of bars 14.

Respective biasers 42 allow the first piece 38 of the panel 34 to be tilted as a means of reducing potential for damage to the indicator 16 caused by the first piece 38 being contacted by an oversized load 28 during loading. Respective biasers 42 also allow the second piece 40 of the panel 34 to be tilted as a means of reducing potential for damage to the indicator 16 caused by the second piece 40 contacting a road obstruction during transport of the load, as shown in FIG. 5.

The indicator 16 comprises a white light 54, which is engaged to the panel 34 proximate to an upper edge 56 of the panel 34 and substantially equally distant from opposed edges 58 of the panel 34. The white light 54 is configured to illuminate a license plate (not shown), which is engageable to the panel 34 below the white light 54. A mounting frame 60 is engaged to the panel 34 below and proximate to the white light 54 and is configured to engage the license plate to mount the license plate to the panel 34.

Figure 1:
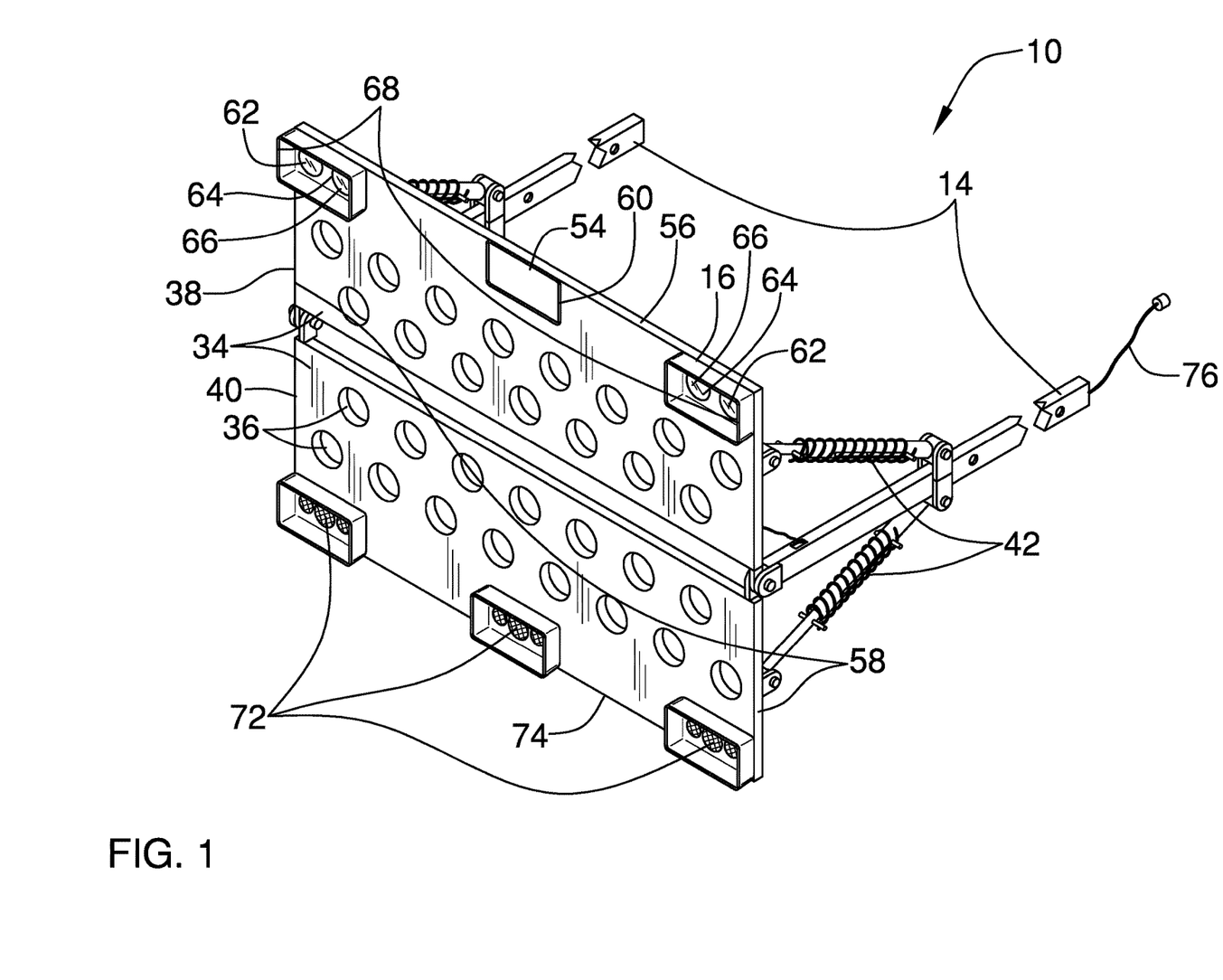
FIG. 1 is an isometric perspective view of a semitrailer rear lighting device according to an embodiment of the disclosure.
Figure 2:
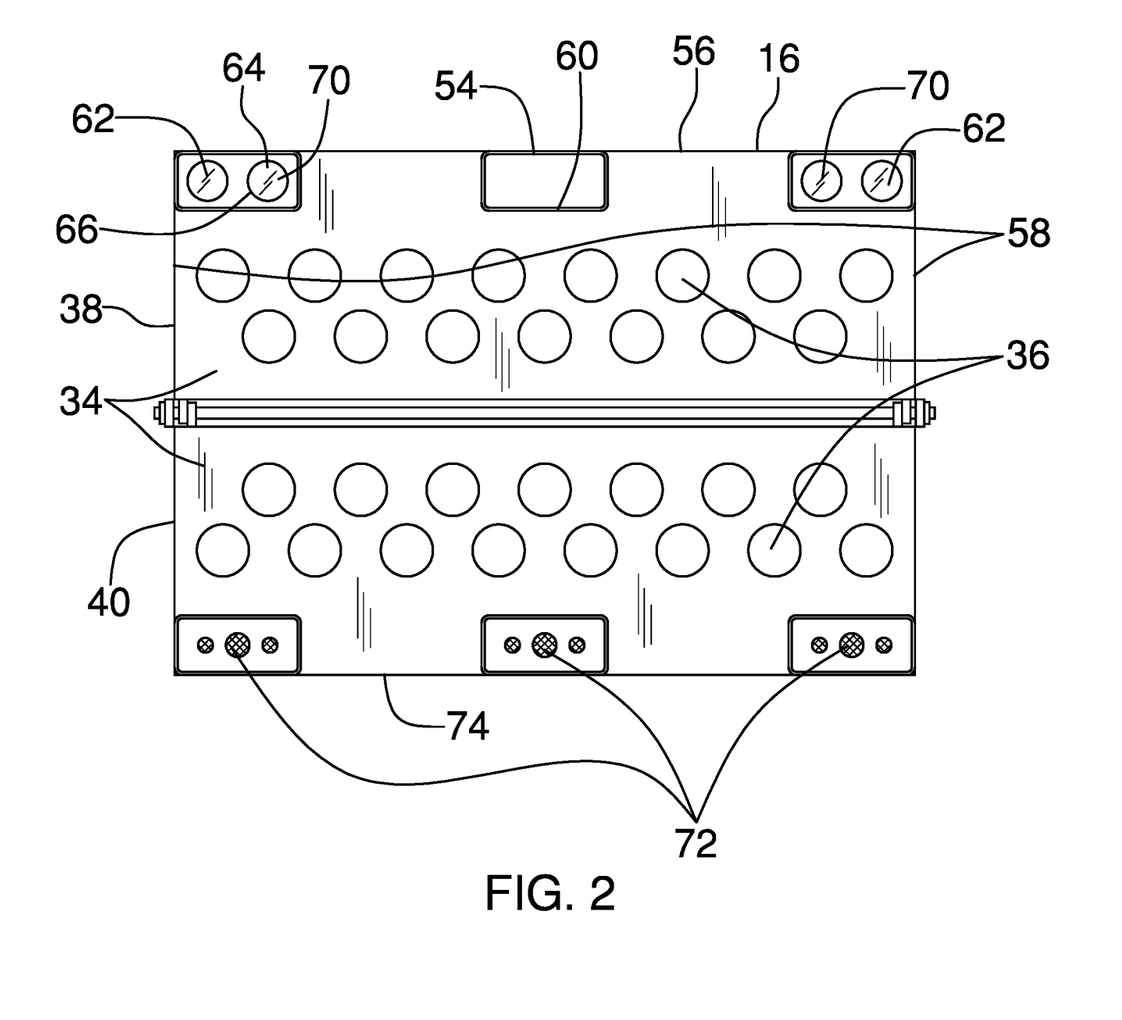
FIG. 2 is a front view of an embodiment of the disclosure.
Figure 3:
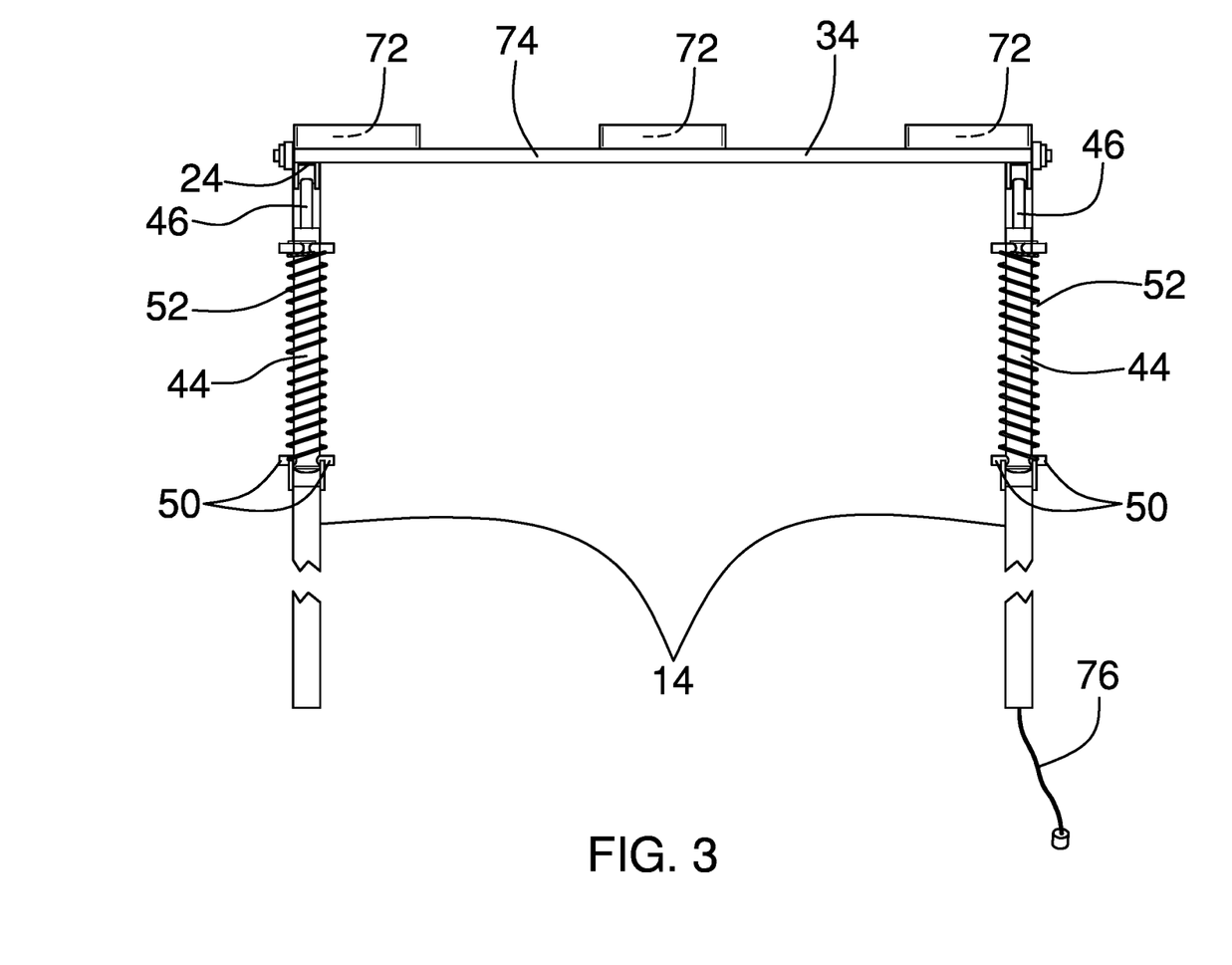
FIG. 3 is a bottom view of an embodiment of the disclosure.

The indicator 16 comprises a pair of taillights 62, a pair of turn signal lights 64, and a pair of brake lights 66. Each taillight 62 is engaged to the panel 34 proximate to the upper edge 56 and adjacent to a respective opposed edge 58 of the panel 34. The taillights 62 are red and are configured to indicate a width 68 of the semitrailer 20. Each turn signal light 64 is engaged to the panel 34 proximate to the upper edge 56 and adjacent to a respective taillight 62. The turn signal lights 64 are red or yellow. Each brake light 66 is engaged to the panel 34 proximate to the upper edge 56 and adjacent to a respective taillight 62. The brake lights 66 and the taillights 62 are red. Each turn signal light 64 and an associated brake light 66 may comprise a single unit 70, as shown in FIG. 2. A plurality of reflectors 72 is engaged to and extends along a lower edge 74 of the panel 34.

A harness extender 76 is engaged to the indicator 16 and extends from the indicator 16 through a respective one of the bars 14. The harness extender 76 is configured to engage a wiring harness of the semitrailer 20 so that the indicator 16 is operationally engaged to the wiring harness.

In use, the pair of bars 14 is slid within the brackets 12 to position the indicator 16 past where the end 26 of the oversized load 28 is anticipated to reach. The harness extender 76 is engaged to a wiring harness of the semitrailer 20 so that the indicator 16 is operationally engaged to the wiring harness. The indicator 16 thus is configured to indicate to a trailing motorist the end 26 of the oversized load 28, a braking action of the semitrailer 20, and a turning of the semitrailer 20. The indicator 16, when positioned in abutment to the rear 22 of the semitrailer, is anticipated to be in compliance with rear lighting requirements for semitrailers.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A semitrailer rear lighting device comprising:
    a plurality of brackets, each bracket being configured to be mountable to a respective opposed side of a semitrailer, such that at least two brackets are mounted to each opposed side;
    a pair of bars, each bar being slidably engaged to the brackets positioned on a respective opposed side of the semitrailer, such that the pair of bars is selectively extensible from a rear of the semitrailer for positioning a terminus of the pair of bars past an end of an oversized load extending past the rear of the semitrailer;
    an indicator engaged to the terminus of the pair of bars, wherein the indicator is configured for indicating to a trailing motorist one or more of the rear of the semitrailer, the end of the oversized load, a braking action of the semitrailer, or a turning of the semitrailer;
    wherein the indicator comprises
        a panel engaged to the terminus of the pair of bars,
        a pair of taillights, each taillight being engaged to the panel proximate to the upper edge and adjacent to a respective opposed edge of the panel, the taillights being red, wherein the taillights are configured for indicating a width of the semitrailer,
a pair of turn signal lights, each turn signal light being engaged to the panel proximate to the upper edge and adjacent to a respective taillight, the turn signal lights being red or yellow,
a pair of brake lights, each brake light being engaged to the panel proximate to the upper edge and adjacent to a respective taillight, the brake lights being red, and
a harness extender engaged to the indicator, the harness extender extending from the indicator through a respective one of the bars, the harness extender being configured for engaging a wiring harness of the semitrailer, such that the indicator is operationally engaged to the wiring harness; and
wherein the panel comprises
a first piece extending upwardly from the pair of bars and a second piece extending downwardly from the pair of bars, the first piece and the second piece being hingedly engaged to the pair of bars, and
a set of biasers, each biaser being engaged to a respective one of the first piece and the second piece proximate to a respective opposed edge of the panel, and extending transversely to an associated bar, such that the panel is biased to a planar configuration perpendicular to the pair of bars.

2. The semitrailer rear lighting device of claim 1, wherein the plurality of brackets comprises from four to ten brackets.

3. The semitrailer rear lighting device of claim 2, wherein the plurality of brackets comprises eight brackets evenly distributed between the opposed sides of the semitrailer.

4. The semitrailer rear lighting device of claim 1, further including a plurality of first holes positioned in the pair of bars, Wherein a first hole positioned in a respective bar is configured for selectively aligning with a respective second hole of a plurality of second holes positioned in an associated opposed side of the semitrailer, such that a locking pin is insertable through the first hole and the respective second hole for fixedly positioning the respective bar relative to the semitrailer.

5. The semitrailer rear lighting device of claim 1, wherein the biaser comprises:
a pipe hingedly engaged to the associated bar;
a rod hingedly engaged to the respective one of the first piece and the second piece, the rod being slidably positioned within the pipe;
a pair of slots opposingly positioned in the pipe;
a pair of pins engaged to the rod distal from the panel, each pin being positioned in a respective slot; and
a spring positioned around the pipe, the spring being engaged to the pipe distal from the bar, the spring being engaged to the pair of pins, such that the spring is compressed when the respective one of the first piece and the second piece is tilted obtusely to the pair of bars.

6. The semitrailer rear lighting device of claim 1, wherein each turn signal light and an associated brake light comprising a single unit.

7. The semitrailer rear lighting device of claim 1, further including:
the indicator comprising a white light engaged to the panel proximate to an upper edge of the panel and substantially equally distant from opposed edges of the panel, wherein the white light is configured for illuminating a license plate engaged to the panel below the white light; and
a mounting frame engaged to the panel below and proximate to the white light, wherein the mounting frame is configured for engaging a license plate for mounting the license plate to the panel.

8. The semitrailer rear lighting device of claim 1, further including a plurality of reflectors engaged to and extending along a lower edge of the panel.

9. The semitrailer rear lighting device of claim 1, further including a plurality of apertures positioned in the panel, wherein the apertures are configured for passage of air through the panel.

10. A semitrailer rear lighting device comprising:
a plurality of brackets, each bracket being configured to be mountable to a respective opposed side of a semitrailer, such that at least two brackets are mounted to each opposed side, the plurality of brackets comprising from four to ten brackets, the plurality of brackets comprising eight brackets evenly distributed between the opposed sides of the semitrailer;
a pair of bars, each bar being slidably engaged to the brackets positioned on a respective opposed side of the semitrailer, such that the pair of bars is selectively extensible from a rear of the semitrailer for positioning a terminus of the pair of bars past an end of an oversized load extending past the rear of the semitrailer;
a plurality of first holes positioned in the pair of bars, wherein a first hole positioned in a respective bar is configured for selectively aligning with a respective second hole of a plurality of second holes positioned in an associated opposed side of the semitrailer, such that a locking pin is insertable through the first hole and the respective second hole for fixedly positioning the respective bar relative to the semitrailer;
an indicator engaged to the terminus of the pair of bars, wherein the indicator is configured for indicating to a trailing motorist one or more of the rear of the semitrailer, the end of the oversized load, a braking action of the semitrailer, or a turning of the semitrailer, the indicator comprising:
a panel engaged to the terminus of the pair of bars, the panel comprising a first piece extending upwardly from the pair of bars and a second piece extending downwardly from the pair of bars, the first piece and the second piece being hingedly engaged to the pair of bars,
a set of biasers, each biaser being engaged to a respective one of the first piece and the second piece, proximate to a respective opposed edge of the panel, and extending transversely to an associated bar, such that the panel is biased to a planar configuration perpendicular to the pair of bars,
the biaser comprising:
a pipe hingedly engaged to the associated bar,
a rod hingedly engaged to the respective one of the first piece and the second piece, the rod being slidably positioned within the pipe,
a pair of slots opposingly positioned in the pipe,
a pair of pins engaged to the rod distal from the panel, each pin being positioned in a respective slot, and
a spring positioned around the pipe, the spring being engaged to the pipe distal from the bar, the spring being engaged to the pair of pins, such that the spring is compressed when the respective one of the first piece and the second piece is tilted obtusely to the pair of bars, a white light engaged to the panel proximate to an upper edge of the panel and substantially equally distant from opposed edges of the panel, wherein the white light is configured for illuminating a license plate engaged to the panel below the white light, a pair of taillights, each taillight being engaged to the panel proximate to the upper edge and adjacent to a respective opposed edge of the panel, the taillights being red, wherein the taillights are configured for indicating a width of the semitrailer;

a pair of turn signal lights, each turn signal light being engaged to the panel proximate to the upper edge and adjacent to a respective taillight, the turn signal lights being red or yellow;

a pair of brake lights, each brake light being engaged to the panel proximate to the upper edge and adjacent to a respective taillight, the brake lights being red, each turn signal light and an associated brake light comprising a single unit, and a harness extender engaged to the indicator, the harness extender extending from the indicator through a respective one of the bars, the harness extender being configured for engaging a wiring harness of the semitrailer, such that the indicator is operationally engaged to the wiring harness;

a mounting frame engaged to the panel below and proximate to the white light, wherein the mounting frame is configured for engaging a license plate for mounting the license plate to the panel;

a plurality of reflectors engaged to and extending along a lower edge of the panel; and a plurality of apertures positioned in the panel, wherein the apertures are configured for passage of air through the panel.

\* \* \* \* \*